March 25, 1958     M. O. TROBAUGH     2,827,876
POULTRY FEEDER
Filed Dec. 31, 1956     2 Sheets-Sheet 2
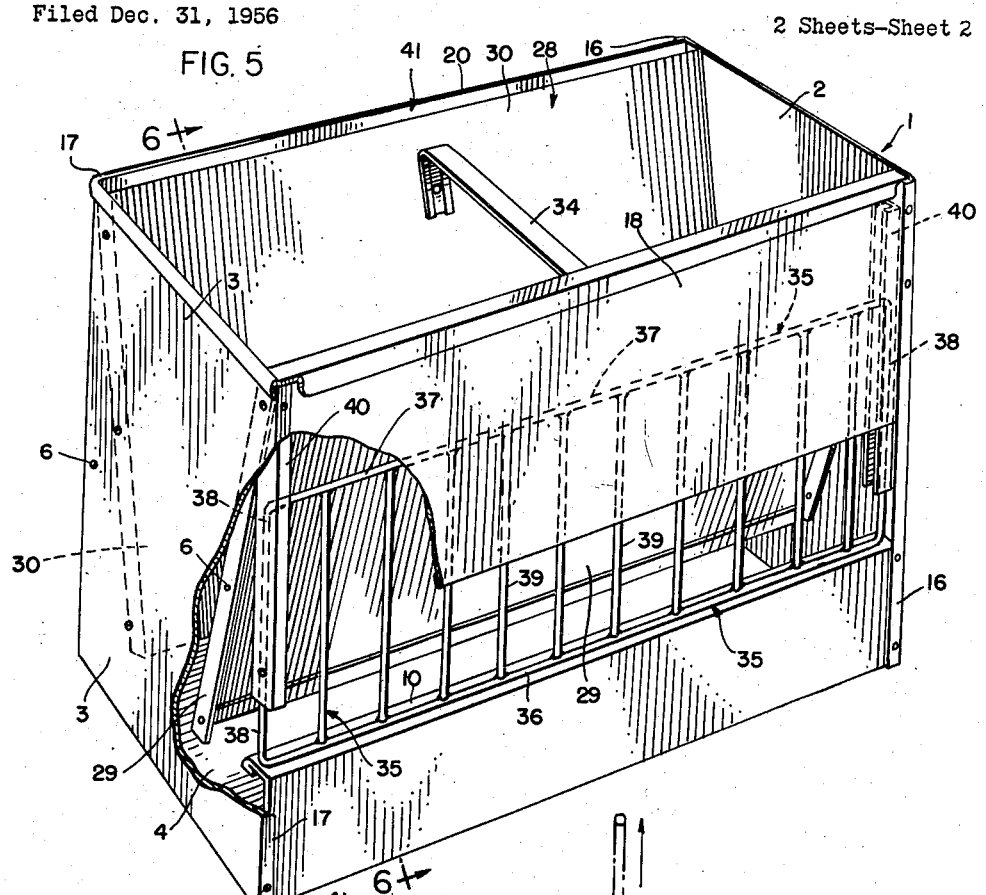
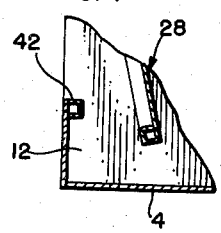
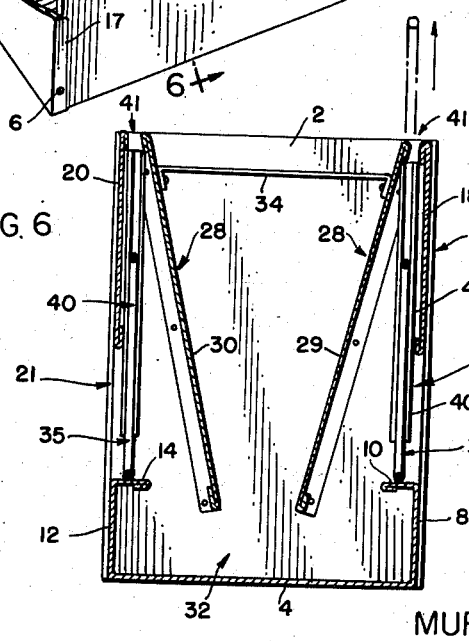
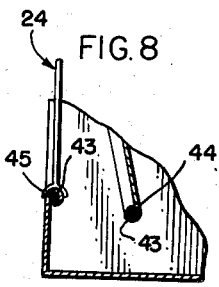
INVENTOR:
MURLE O. TROBAUGH
BY
Margall, Johnston, Cook & Root.
ATT'YS

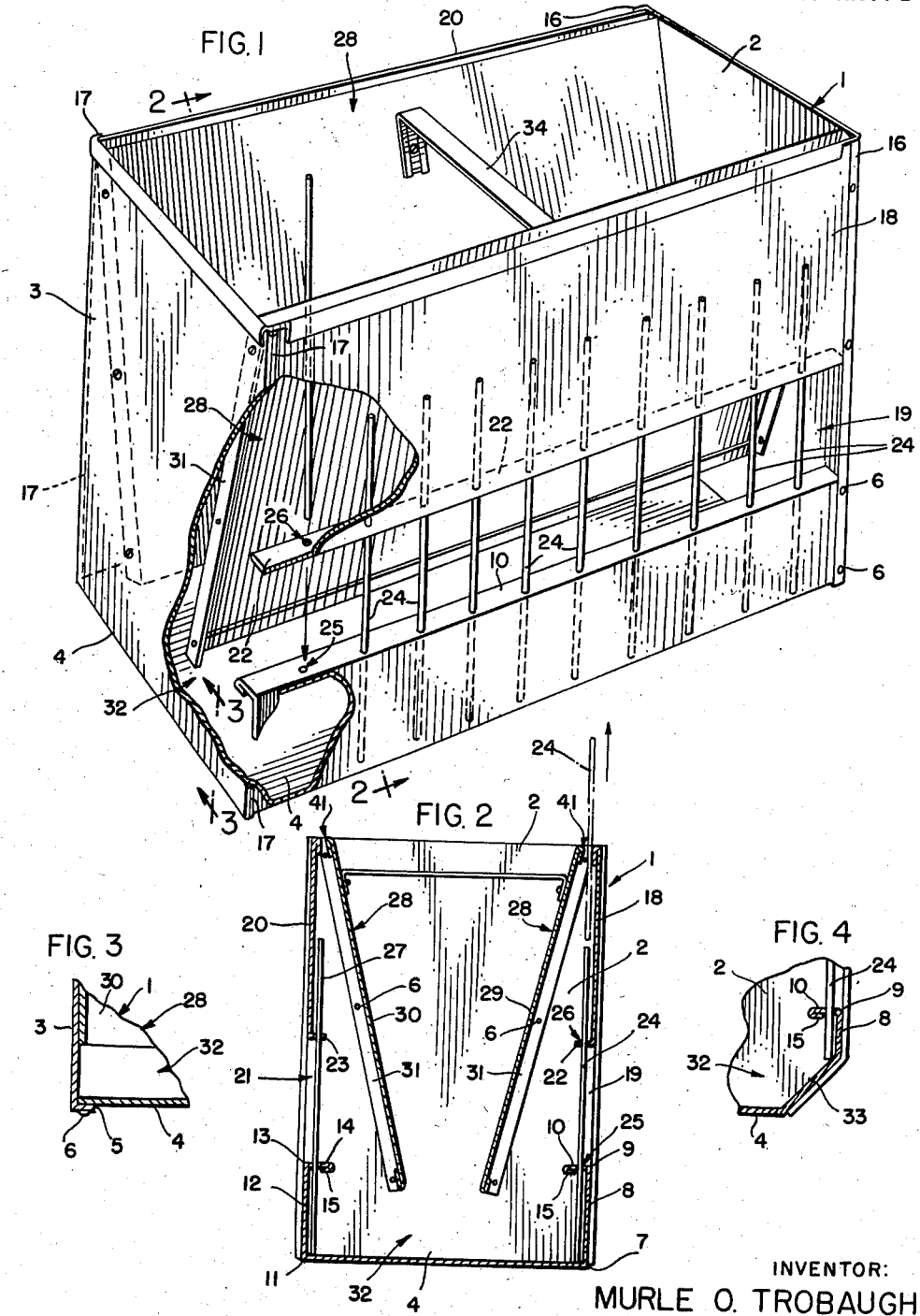

United States Patent Office 2,827,876
Patented Mar. 25, 1958

2,827,876

POULTRY FEEDER

Murle O. Trobaugh, Macomb, Ill.

Application December 31, 1956, Serial No. 631,599

3 Claims. (Cl. 119—52)

This invention relates to a poultry feeder embodying a feed hopper and a bottom feed trough, feed from the hopper falling by gravity onto the bottom of the feeder into the trough part thereof, whereby the proper level of feed is maintained in the bottom of the feeder or trough part thereof so long as there is feed in the hopper.

The primary object of the present invention is to provide a new and improved poultry feeder which is composed of few and relatively simple parts, which is inexpensive to manufacture, which is durable in construction, and which is adapted to be easily cleaned.

A more specific object consists in new and improved means in the form of gratings or grills, such as spaced rods cooperating with supports, to provide separations for the necks of the fowls at the front and rear openings to prevent chickens, or other poultry, from actually getting into the trough, but still to permit proper and sufficient feeding space for several fowls, as well as preventing feed in the trough from being thrown out and being wasted on the ground.

A still further object of the invention provides for the provision of new and improved means in the form of a grill, such as a frame, or spaced rods, removable or shiftable, to permit easy access to the interior of the trough for cleaning or other purposes.

Numerous other objects and advantages will be apparent throughout the progress of the specification which is to follow.

The accompanying drawings illustrate certain selected embodiments of the invention, and the views therein are as follows:

Fig. 1 is a detail perspective view of the new and improved poultry feeder of the invention, with parts broken away for purposes of clarity;

Fig. 2 is a reduced vertical sectional view taken substantially along the line 2—2 of Fig. 1;

Fig. 3 is a detail vertical sectional elevation on the line 3—3 of Fig. 1, showing the manner in which the sides and bottom of the feeder may be secured together;

Fig. 4 is a modified form of a front and rear corner construction which is sloped to cause the feed to be directed inwardly for easy access.

Fig. 5 is a view similar to Fig. 1, but showing a modified form of grill arrangement;

Fig. 6 is a vertical sectional view on the line 6—6 of Fig. 5;

Fig. 7 is a detail vertical sectional view showing box flanges instead of flat flanges; and Fig. 8 is a view similar to Fig. 7 showing curled flanges and rods for rendering rigidity to the feeder.

The particular poultry feeder, herein shown for the purpose of illustrating the invention, is preferably made of sheet metal and comprises a box-like container 1 having opposed side end members or panels 2 and 3 to which a bottom 4 is secured. The lower edge of each of the side panels or members 2 and 3 is turned over to form a flange 5, Fig. 3, upon which the bottom 4 is mounted. The bottom 4 may be secured to the flanges by any conventional fastening means 6, such as bolts or rivets, sheet metal screws being specifically shown.

The front of the bottom 4 is bent at 7, Fig. 2, and then turned upwardly to provide an upstanding lower front wall 8. The upper end of this front wall 8 is bent at 9, and then projected inwardly to form an inturned flange 10. Similarly, the rear of the bottom 4 is bent at 11, and then turned upwardly to provide an upstanding lower front wall 12. The upper end of this rear wall 12 is bent as indicated at 13, and then projected inwardly to form an inturned flange 14. The material at the ends of the flanges 10 and 14 may be turned over as indicated at 15, Figs. 1 and 2, to overcome sharp edges.

The end panel 2 is provided on its sides with integral vertically turned flanges 16, 16 which are secured to the walls 8 and 12 by fastening means 6. Likewise, the end panel 3 is provided on its sides with integral vertical turned flanges 17, 17 which are secured to the walls 8 and 12 by fastening means 6.

An upper front wall or panel 18 is spaced above the upper edge of the flange 10 on the lower front wall part 8, there being a space 19 between the lower front wall 8 and the upper front wall or panel 18 to permit access to the interior of the feeder cabinet. The upper front panel 18 is secured to the flanges 16, 16 on one edge of the end or panel 2 and at its other edge by the flanges 17 on the other end wall or panel 3. Also, an upper rear wall or panel 20 is spaced above the upper edge or flange 14 on the lower front wall part 12, there being a space 21 between the rear walls 12 and 20 to permit access by the fowl to the interior of the feeder cabinet. The upper rear wall 20 is secured to the flanges 16 and 17 of the end or panel 3. The lower ends of the upper walls 18 and 20 are provided with inturned flanges 22 and 23, respectively, Fig. 2.

A plurality of spaced apart vertically extending front rods 24 are arranged in alined holes 25 and 26 in the flange 10 of the lower wall 8 and the flange 22 of the upper front wall 18, respectively. The several rods 24 coact to define a grill for covering the opening or space 19. Rods 27 are removably mounted in corresponding alined holes in the flanges 14 and 23 of the rear lower wall 12 and the rear upper wall 20. The rods 24 and 27 may be completely removable to permit cleaning of the device or, if preferred, they may be raised upwardly a predetermined distance to permit manual access into the interior of the device. The end panels 2 and 3 are identical, as are the front and rear panels, so that the fowls may have access to feed in the feeder from both the front and rear, thus doubling the capacity of the feeder.

A hopper 28 is arranged interiorly of the feeder and comprises an inwardly inclined front wall 29 and an inwardly inclined rear wall 30. The walls 29 and 30 are provided with integral turned flanges 31, 31 which are secured to the respective end panels 2 and 3 in any conventional manner, such as by the use of fastening means 6. The lower end of the hopper 28 has its converging walls 29 and 30 terminating a predetermined distance above the top of the bottom 4, thus providing a feed trough 32. The upper ends of the inclined hopper walls 29 and 30 terminate relatively even with the upper sides of the walls 18 and 20 and the upper ends of the end panels 2 and 3. Poultry feed is adapted to be inserted in the hopper 28 and filled completely to the top. The feed in the hopper 28 will fall outwardly from the bottom of the hopper, filling the bottom of the trough 32 and spreading outwardly a predetermined distance, but below the bottom of the flanges 10 and 14. The flanges 10 and 14 thus provide a dual purpose. The flanges 10 and 14 provide a support and guide for the spaced wires 24 and 27, as well as providing means for preventing feed from being thrown out of the trough 32 and wasted on the ground.

The juncture of the lower walls 8 and 12 with the bottom 4 is shown relatively square, but the bottom 4 and a part of the lower front walls may be inclined at 33, as shown in Fig. 4.

One or more cross braces 34 may be secured lengthwise along the hopper to act as stiffeners, depending upon the length of the poultry feeder, as well as to provide handles to assist in moving the poultry feeder from one location to another.

The modified arrangement shown in Figs. 5 and 6, as far as the basic feeder and hopper are concerned, is basically the same as shown in Figs. 1 to 3. However, instead of employing the loose or removable rods 24 and 27, separate grill frames 35 may be arranged across the front and rear openings 19 and 21. Each frame 35 comprises a lower bar or rod 36 and an upper bar or rod 37 to which end rods 38, 38 and intermediate rods 39 may be secured.

Each frame 35 is adapted to be slidably mounted in guideways 40 mounted on the inside of the end panels 2 and 3 at the front and rear thereof and forward of the adjacent hopper wall. The frames 35 are slidably mounted and may be removable, but when in place, may rest upon their respective flanges 10 and 14.

The upper outer edges of the front and rear inclined hopper walls 29 and 30 are spaced a predetermined distance inwardly on both sides to provide spaces as indicated at 41, Figs. 2 and 6, and thus permit removal of the individual rods 24 or 27, Figs. 1 and 2, or the separate frames 35, Figs. 5 and 6.

In order to add strength and rigidity to the feeder, particularly in cases where the feeder is to be relatively long, the outer free edges of the material may be supported both on the feeder itself and on the hopper. The strengthening supports may consist in bending the metal to form box flanges as shown in Fig. 7, or they may comprise rods 43 as shown in Fig. 8. If desirable, the rods 43 may have the metal curled around as indicated at 44, Fig. 8. In cases where the horizontal supports at the upper and lower ends of the openings 19 and 21 comprise rods 43, the vertical rods 24 may have their lower ends bifurcated as indicated at 45, Fig. 8.

Although not shown, a cover may be used for closing the entire top of the poultry feeder. This cover may be hinged to either the front or rear, or to either side of the device, but in actual practice it has been found desirable to provide a removable cover closure with a down turned peripheral flange which extends downwardly over the outer periphery of the feeder. This cover is for the purpose of preventing rain or snow from getting into the feed in the hopper, as well as preventing the fowls from getting into the hopper 28.

The invention provides an exceedingly simple, very economical, thoroughly rigid and durable poultry feeder which may be assembled quickly and readily at a relatively low cost.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A poultry feeder comprising a box-like container having opposed end panels, a bottom connected to said end panels, a low front wall extending from said bottom, an upper front panel spaced from said low front wall to provide an opening across the container, front and rear hopper walls within said container extending downwardly and inwardly toward each other over the length of the container, the upper outer portion of the hopper wall adjacent the front panel of the container being spaced inwardly of the said upper front panel, and a grill of spaced upright rod elements slidably received and retained between the upper outer portion of the front hopper wall and the upper portion of the adjacent upper front panel and spanning the opening across the container.

2. The combination of claim 1 in which said rod elements rest on said bottom and are separately removable from the container.

3. The combination of claim 1 including vertical guideway means comprising an inwardly open channel on the inner side of each opposed end panel and extending between the upper front panel and the adjacent side of the front hopper wall, and an integral grill of spaced, upright rod elements slidably engaged by the open channels and spanning the opening across the container.

References Cited in the file of this patent

UNITED STATES PATENTS

| | | |
|---|---|---|
| 1,656,061 | Hall | Jan. 10, 1928 |
| 2,607,318 | Collier et al. | Aug. 19, 1952 |